US011881661B2

(12) United States Patent
Paynter

(10) Patent No.: US 11,881,661 B2
(45) Date of Patent: Jan. 23, 2024

(54) GANGED COAXIAL CONNECTOR ASSEMBLY WITH REMOVABLE CONNECTOR-CABLE CONFIGURATION

(71) Applicant: CommScope Technologies LLC, Hickory, NC (US)

(72) Inventor: Jeffrey D. Paynter, Momence, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 18/177,382

(22) Filed: Mar. 2, 2023

(65) Prior Publication Data

US 2023/0208085 A1 Jun. 29, 2023

Related U.S. Application Data

(63) Continuation of application No. 17/496,835, filed on Oct. 8, 2021, now Pat. No. 11,605,923.

(Continued)

(51) Int. Cl.

*H01R 24/40* (2011.01)
*H01R 25/00* (2006.01)

(Continued)

(52) U.S. Cl.

CPC ........... *H01R 24/40* (2013.01); *H01R 13/623* (2013.01); *H01R 13/6315* (2013.01); *H01R 25/003* (2013.01); *H01R 2103/00* (2013.01)

(58) Field of Classification Search

CPC .. H01R 24/40; H01R 13/623; H01R 13/6315; H01R 25/003; H01R 2103/00;

(Continued)

(56) References Cited

U.S. PATENT DOCUMENTS

| | | | | |
|---|---|---|---|---|
| 3,668,608 A | 6/1972 | William | | |
| 6,409,550 B1 * | 6/2002 | Splichal | ................ | H01R 24/52 439/701 |

(Continued)

FOREIGN PATENT DOCUMENTS

| | | | |
|---|---|---|---|
| CN | 109256645 A | 1/2019 | |

OTHER PUBLICATIONS

"International Preliminary Report on Patentability corresponding to International Application No. PCT/2021/053707 dated Jun. 15, 2023".

(Continued)

*Primary Examiner* — Briggitte R. Hammond
(74) *Attorney, Agent, or Firm* — Myers Bigel, P.A.

(57) ABSTRACT

A ganged connector assembly includes: a plurality of coaxial connectors, each of the coaxial connectors connected with a respective coaxial cable extending rearwardly therefrom, each of the coaxial connectors including an inner contact and an outer body that is electrically separated from the inner contact; a shell having a plurality of cavities; and a plurality of rear bodies, each of the rear bodies encircling a respective outer body, each of the rear bodies mounted in a respective cavity of the shell. Each of the rear bodies includes a first locking feature. A second locking feature is located in each of the cavities and is fixed relative to the shell. The first and second locking features are configured such that rotation of a first of the plurality of rear bodies relative to the shell moves the first rear body between locked and unlocked positions, wherein in the locked position a respective first connector and respective first cable are secured with the shell within a respective cavity, and in the unlocked position the first connector and first cable can be removed from the shell without removing the remaining connectors and cables.

11 Claims, 13 Drawing Sheets

Related U.S. Application Data

(60) Provisional application No. 63/120,483, filed on Dec. 2, 2020.

(51) Int. Cl.
*H01R 13/631* (2006.01)
*H01R 103/00* (2006.01)
*H01R 13/623* (2006.01)

(58) Field of Classification Search
CPC ............ H01R 13/508; H01R 13/62933; H01R 2107/00; H01R 24/52
See application file for complete search history.

(56) References Cited

U.S. PATENT DOCUMENTS

| | | | | |
|---|---|---|---|---|
| 7,347,745 | B1 * | 3/2008 | Raudenbush | H01R 24/40 439/752 |
| 8,550,859 | B2 | 10/2013 | Van Swearingen | |
| 10,148,049 | B2 | 12/2018 | Yi | |
| 11,605,923 | B2 * | 3/2023 | Paynter | H01R 13/508 |
| 2013/0157487 | A1 | 6/2013 | Heebe et al. | |
| 2018/0175520 | A1 | 6/2018 | Wu et al. | |
| 2019/0312394 | A1 | 10/2019 | Paynter et al. | |
| 2019/0348803 | A1 | 11/2019 | Davidson | |
| 2019/0363481 | A1 | 11/2019 | Paynter et al. | |

OTHER PUBLICATIONS

"International Search Report and Written Opinion corresponding to International Application No. PCT/2021/053707 dated Jan. 27, 2022".

* cited by examiner

GANGED COAXIAL CONNECTOR ASSEMBLY WITH REMOVABLE CONNECTOR-CABLE CONFIGURATION

RELATED APPLICATIONS

The present application is a continuation of and claims priority to U.S. patent application Ser. No. 17/496,835, filed Oct. 8, 2021, now U.S. Pat. No. 11,605,923, which claims priority from and the benefit of U.S. Provisional Patent Application No. 63/120,483, filed Dec. 2, 2020, the disclosure of which is hereby incorporated herein by reference in its entirety.

FIELD OF THE INVENTION

The present invention relates generally to electrical cable connectors and, more particularly, to ganged connector assemblies.

BACKGROUND OF THE INVENTION

Coaxial cables are commonly utilized in RF communications systems. Coaxial cable connectors may be applied to terminate coaxial cables, for example, in communication systems requiring a high level of precision and reliability.

Connector interfaces provide a connect/disconnect functionality between a cable terminated with a connector bearing the desired connector interface and a corresponding connector with a mating connector interface mounted on an apparatus or a further cable. Some coaxial connector interfaces utilize a retainer (often provided as a threaded coupling nut) that draws the connector interface pair into secure electro-mechanical engagement as the coupling nut, rotatably retained upon one connector, is threaded upon the other connector.

Alternatively, connection interfaces may be also provided with a blind mate characteristic to enable push-on interconnection, wherein physical access to the connector bodies is restricted and/or the interconnected portions are linked in a manner where precise alignment is difficult or not cost-effective (such as the connection between an antenna and a transceiver that are coupled together via a rail system or the like). To accommodate misalignment, a blind mate connector may be provided with lateral and/or longitudinal spring action, or "float," to accommodate a limited degree of insertion misalignment. Blind mated connectors may be particularly suitable for use in "ganged" connector arrangements, in which multiple connectors (for example, four connectors) are attached to each other and are mated to mating connectors simultaneously.

Examples of ganged coaxial connectors are discussed in U.S. Patent Publication No. 2019/0312394 to Paynter, the disclosure of which is hereby incorporated herein by reference in full. This publication identifies solutions for two different issues that can arise with ganged blind mate connectors: "float" and secure interconnection. Ganged connectors are shown therein with a common shell. Each individual "male" connector is sized to be able to "float" axially, angularly and radially relative to the shell. Also, each individual "male" connector engages a respective helical spring that also engages the shell. Although each connector can move relative to the shell to adjust during mating, compression in the spring can provide sufficient force that, once the male connector is mated, the male connector is maintained in position relative to the shell. The ganged male connectors are secured to the mating "female" connectors via a pivoting latch that captures a pin on gang of male connectors.

It may be desirable to develop additional concepts and solutions for ganged coaxial connectors.

SUMMARY OF THE INVENTION

As a first aspect, embodiments of the invention are directed to a ganged connector assembly. The assembly comprises: a plurality of coaxial connectors, each of the coaxial connectors connected with a respective coaxial cable extending rearwardly therefrom, each of the coaxial connectors including an inner contact and an outer body that is electrically separated from the inner contact; a shell having a plurality of cavities; and a plurality of rear bodies, each of the rear bodies encircling a respective outer body, each of the rear bodies mounted in a respective cavity of the shell. Each of the rear bodies includes a first locking feature. A second locking feature is located in each of the cavities and is fixed relative to the shell. The first and second locking features are configured such that rotation of a first of the plurality of rear bodies relative to the shell moves the first rear body between locked and unlocked positions, wherein in the locked position a respective first connector and respective first cable are secured with the shell within a respective cavity, and in the unlocked position the first connector and first cable can be removed from the shell without removing the remaining connectors and cables.

As a second aspect, embodiments of the invention are directed to a ganged connector assembly comprising: a plurality of coaxial connectors, each of the coaxial connectors connected with a respective coaxial cable extending rearwardly therefrom, each of the coaxial connectors including an inner contact and an outer body that is electrically separated from the inner contact; a shell having a plurality of cavities; a plurality of rear bodies, each of the rear bodies encircling a respective outer body, each of the rear bodies mounted in a respective cavity of the shell, wherein each of the rear bodies includes a radially-outward tab; and a plurality of retainer rings, each of the retainer rings located in a respective cavity and fixed relative to the shell, each of the retainer rings including a discontinuous lip having a first gap and a recess. The tabs, lips, first gaps and recesses are configured such that rotation of a first of the plurality of rear bodies relative to a first of the retainer rings moves the first rear body between locked and unlocked positions, wherein in the locked position a respective first tab is received in a respective first recess to secure a respective first connector and respective first cable with the shell within a respective cavity, and in the unlocked position the tab may pass through the first gap to enable the first connector and first cable to be removed from the shell without removing the remaining connectors and cables.

As a third aspect, embodiments of the invention are directed to a ganged connector assembly comprising: a plurality of coaxial connectors, each of the coaxial connectors connected with a respective coaxial cable extending rearwardly therefrom, each of the coaxial connectors including an inner contact and an outer body that is electrically separated from the inner contact; a shell having a plurality of cavities; a plurality of rear bodies, each of the rear bodies encircling a respective outer body, each of the rear bodies mounted in a respective cavity of the shell, wherein each of the rear bodies includes a radially-outward tab; a plurality of retainer rings, each of the retainer rings located in a respective cavity and fixed relative to the shell, each of the retainer rings including a discontinuous lip having a first gap and a recess; and a plurality of biasing members, each associated with a coaxial connector. The tabs, lips, first gaps and recesses are configured such that rotation of a first of the plurality of rear bodies relative to a first of the retainer rings moves the first rear body between locked and unlocked positions, wherein in the locked position a respective first tab is received in a respective first recess to secure a respective first connector and respective first cable with the shell within a respective cavity, and in the unlocked position the tab may pass through the first gap to enable the first connector and first cable to be removed from the shell without removing the remaining connectors and cables. A first of the plurality of biasing members is positioned between the first rear body and the outer body of the first coaxial connector, the biasing member biasing the outer body of the first coaxial connector forwardly and the first rear body rearwardly, such that in the locked position the first biasing member urges the first tab to remain in the first recess.

DETAILED DESCRIPTION OF THE INVENTION

Figure 1:
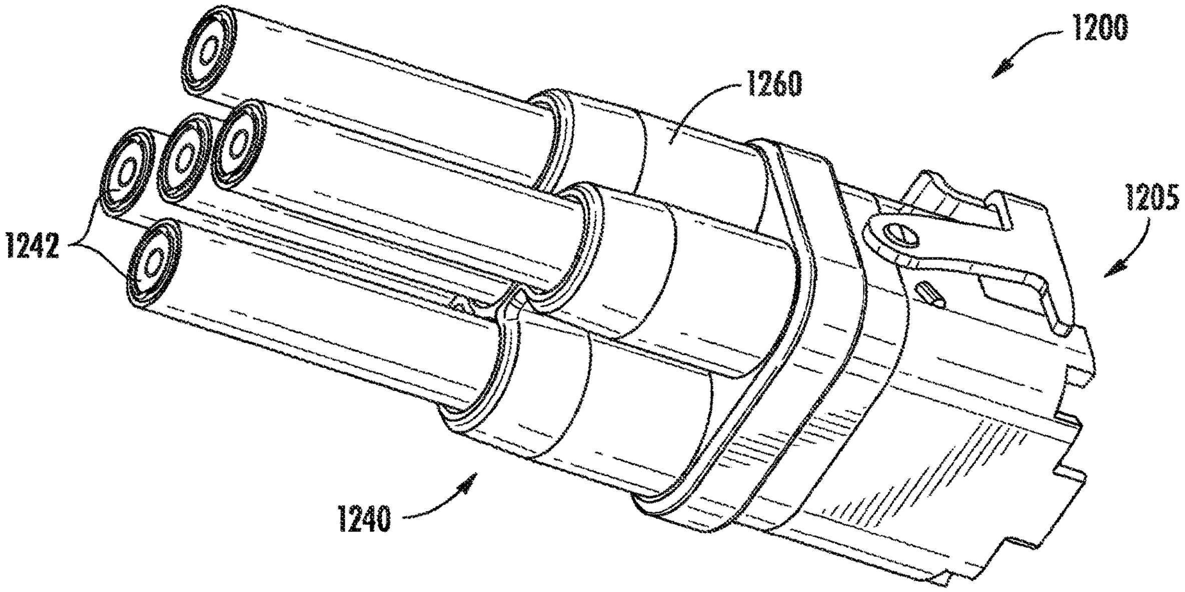
FIG. 1 (PRIOR ART)
FIG. 1 is a perspective view of a prior assembly of mated ganged connectors.

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

As noted above, an issue that can arise with ganged connector assemblies is the alignment of individual mating connectors. Proper mating of the individual "male" connectors with the individual "female" connectors is needed to ensure that sound electrical contact is made. Quality of electrical contact can become more vital at high performance levels, as poor or inconsistent contact can produce unpredictable passive intermodulation (PIM) performance. PIM is an undesirable effect that can manifest itself in poor connections. As such, it is important in designing mating connectors that the contact/engagement between them be consistent and predictable.

A ganged connector assembly can introduce inconsistency in connector mating simply due to variables such as component tolerances. Thus, the ability of the mating connectors in a ganged assembly to float relative to the housing in which they are mounted, and to do so in a manner that maintains reliable and consistent contact between mating connectors, can be very desirable. Float can involve axial (i.e., in the direction of mating), radial (i.e., movement normal to the axial direction), and angular ("tilting" movement relative to the axial direction) components, so any float mechanisms or solution should permit movement in these three modes.

It has also been noted that, with many ganged connector assemblies, during manufacturing one cable may be faulty, or during use one cable may become unusable or inoperable. When this happens, in most instances the entire assembly must be replaced. It may be desirable to provide ganged coaxial connector assemblies in which one cable may be replaced within the assembly, rather than having to scrap the entire assembly.

Figure 2:
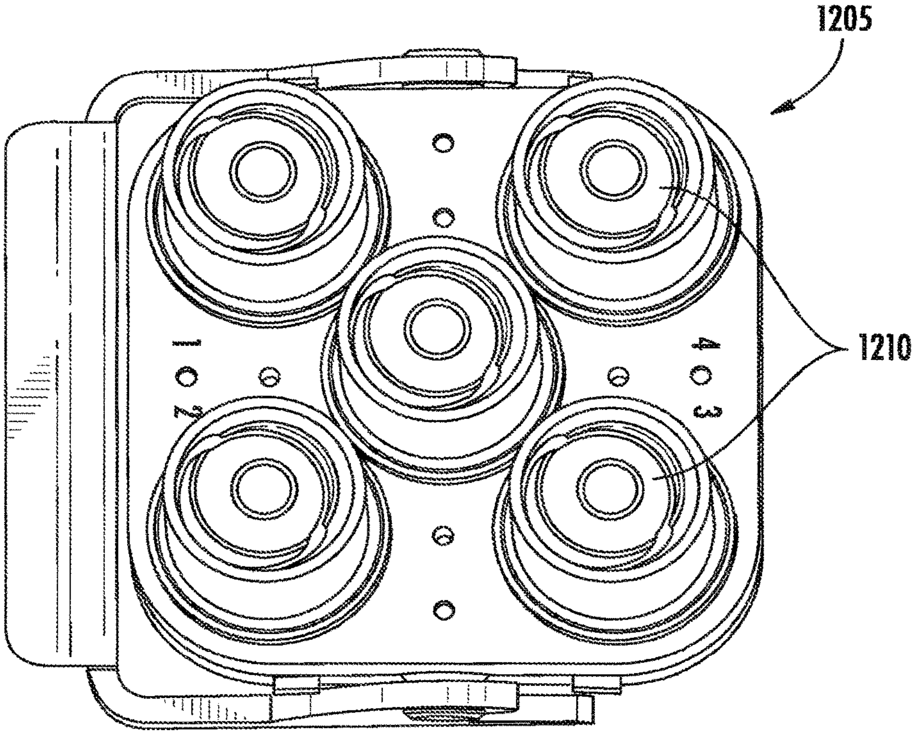
FIG. 2 (PRIOR ART)
FIG. 2 is an end perspective view of the assembly of FIG. 1.
Figure 3:
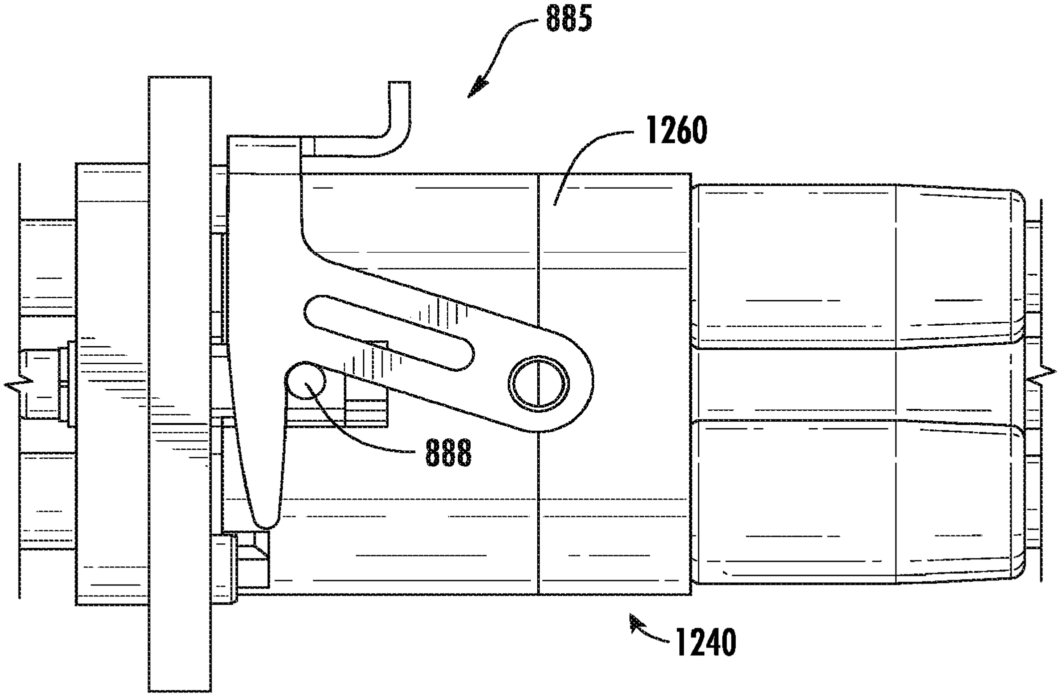
FIG. 3 (PRIOR ART)
FIG. 3 is a side view of the assembly of FIG. 1 mated with a mating assembly and the latch engaged to secure the assemblies together.
Figure 4:
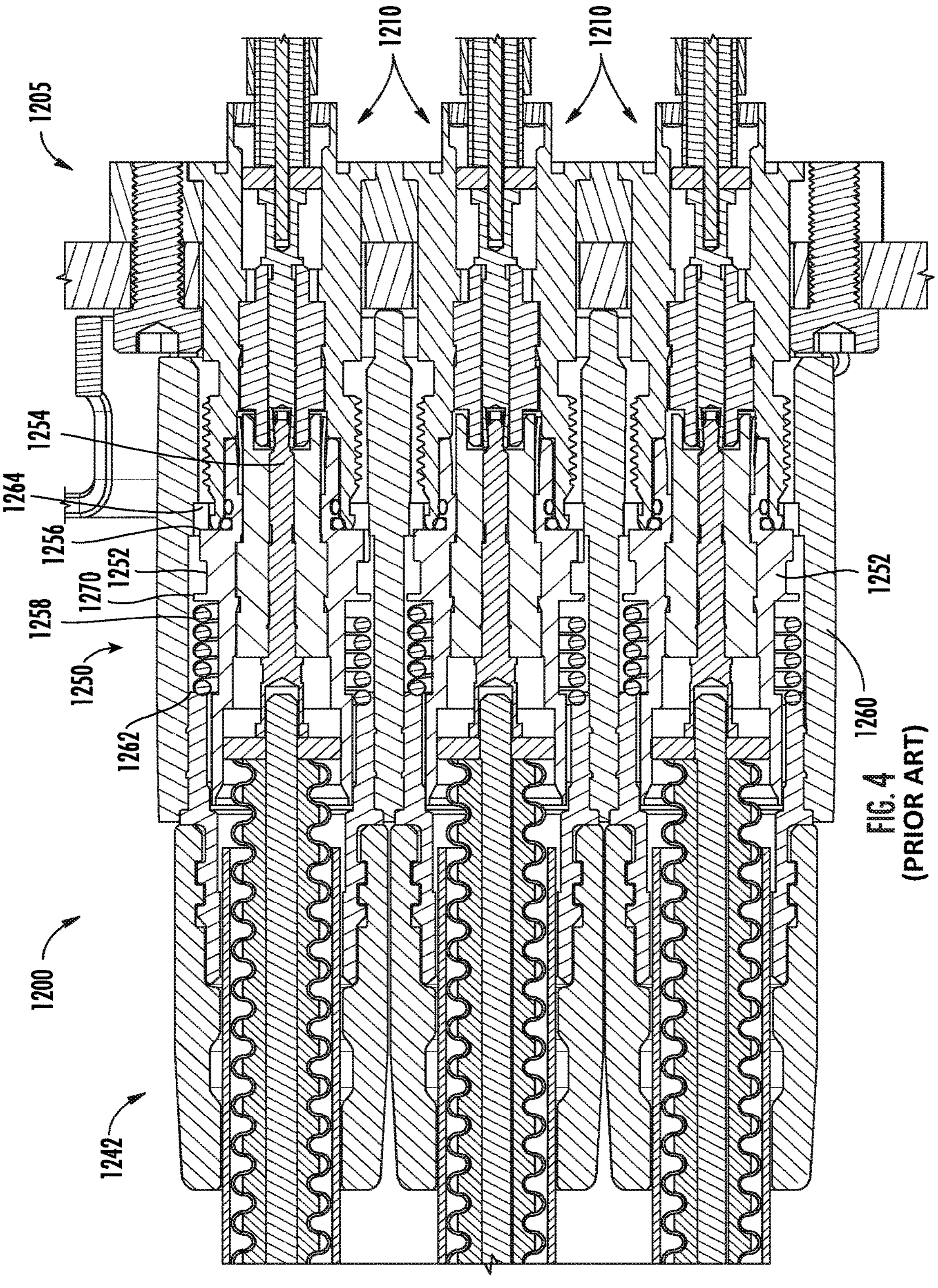
FIG. 4 (PRIOR ART)
FIG. 4 is a section view of the assembly of FIG. 1 showing the springs employed to provide the individual connectors the ability to "float" relative to the housing.

Referring now to the drawings, an example of an assembly with provisions for axial, radial and angular float is shown in FIGS. 1-4. The paired assembly of connectors 1200 shown therein includes an equipment connector assembly 1205 with five connectors 1210 and a cable connector assembly 1240 with five connectors 1250 connected to five cables 1242. As shown in FIGS. 1-2 and 4, the connectors 1210 and 1250 are arranged in a cruciform pattern, with one of the connectors 1210, 1250 surrounded by four other connectors 1210, 1250 separated from each other by 90 degrees. As shown in FIG. 3, the assemblies 1205, 1240 can be secured with a latch 885 that is pivotally mounted to the assembly 1205 and engages a pin 888 on the assembly 1240.

Referring now to FIG. 4, it can be seen that the connectors 1250 of the cable-connector assembly 1240 reside in a shell 1260. Each of the connectors 1250 includes an outer connector body 1252 and an inner contact 1254 that mate with, respectively, an outer connector body 1212 and an inner contact 1214 of a mating connector 1210 of the equipment connector assembly 1205. FIG. 4 also illustrates that each outer connector body 1252 is encircled by a helical spring 1258 that extends between a shoulder 1262 in the shell 1260 and a flange 1270 on the outer connector body 1252. The spring 1258 remains in compression. A shoulder 1256 of the outer connector body 1252 is positioned to engage a second shoulder 1264 of the shell 1260 and provide a forward limit on the forward movement of the outer connector body 1252. There is also space radially outward of the outer connector body 1252 between it and the shell 1260. Thus, the connector 1250 has the ability to float axially, radially, and angularly relative to the shell 1260, which can enable each of the connectors 1250 to adjust its position individually as needed to mate with the connectors 1210 of assembly 1205. The compressed spring 1258 provides sufficient force on the shell 1260 and the connector 1250 to maintain the connector 1250 in position relative to the shell 1260 once the connector 1250 has adjusted its position during mating.

Figure 5:
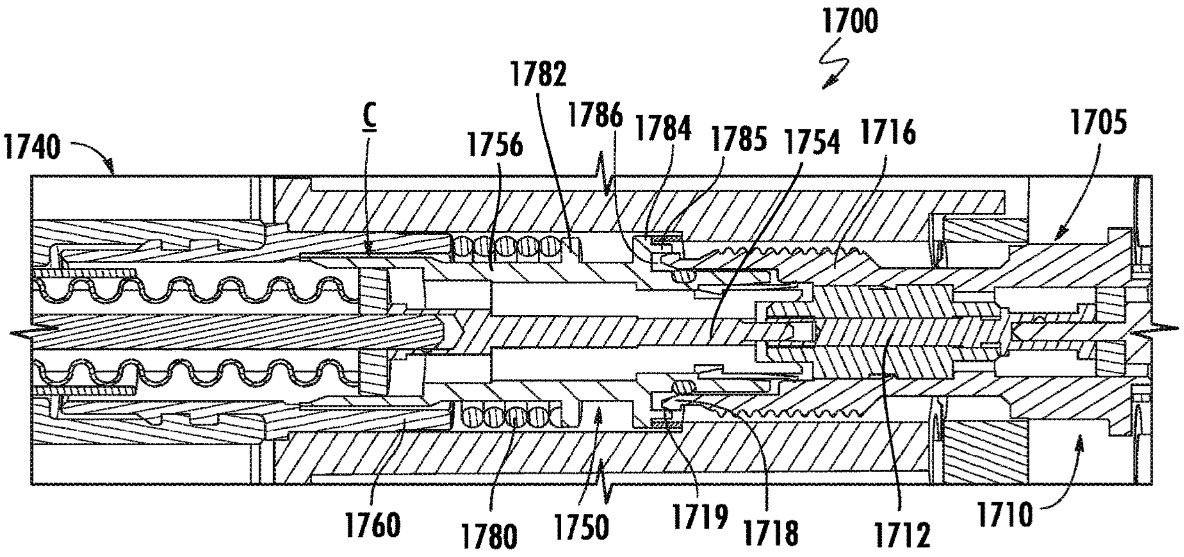
FIG. 5 (PRIOR ART)
FIG. 5 is a section view of an alternative version of the assembly of FIG. 1 showing springs that provide the ability of the connectors to float.

FIG. 5 illustrates another embodiment of a ganged connector assembly 1700. The assembly 1700 is similar to the assembly 1200, with an equipment connector assembly 1705 having connectors 1710 mating with a cable connector assembly 1740 with connectors 1750 in a shell 1760. Springs 1780 provide the capacity for axial and radial adjustment of the outer connector body 1756 relative to the shell 1760 as discussed above. In this embodiment, the outer connector body 1756 has a radially-outward flange 1784 located forwardly of the flange 1782 (which captures the forward end of the spring 1780). The flange 1784 has a trepan groove 1786 in its forward surface (a projection 1785 is located radially outward of the groove 1785). Also, at the rear end of the outer connector body 1756, there is greater clearance gap C between the outer connector body 1756 and the shell 1760 than in the assembly 1200 shown in FIGS. 1-4. The outer connector body 1716 of the connector 1710 has a beveled outer edge 1719 at its forward end 1718.

As shown in FIG. 5, during initial mating of the connectors 1710, 1750, the inner contact 1754 of the connector 1750 engages the inner contact 1712 of the connector 1710, which provides a first "centering" action of the connector 1750. This action also causes the spring 1780 to "bottom out." As mating continues, the spring 1780 opens slightly, which causes the beveled outer edge 1719 of the outer connector body 1716 to contact the projection 1785. This interaction provides a second "centering" action to mating, which enables the clearance gap C between the rear portion of the outer connector body 1756 and the shell 1760 to be greater than in other embodiments.

Additional embodiments are disclosed and described in U.S. Patent Publication No. 2019/0312394 to Paynter, supra.

Figure 6:
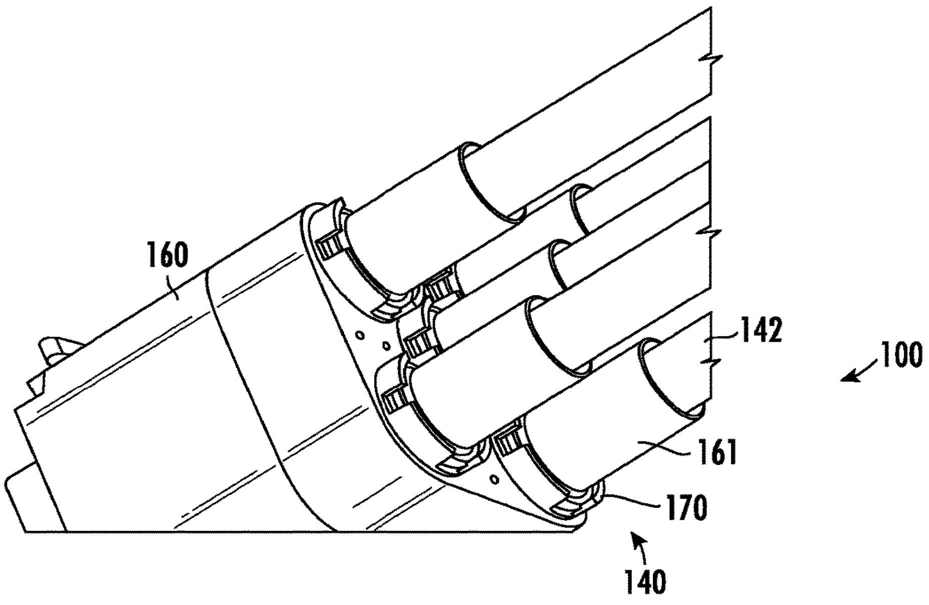
FIG. 6 is a rear perspective view of ganged connector assembly according to embodiments of the invention.
Figure 7:
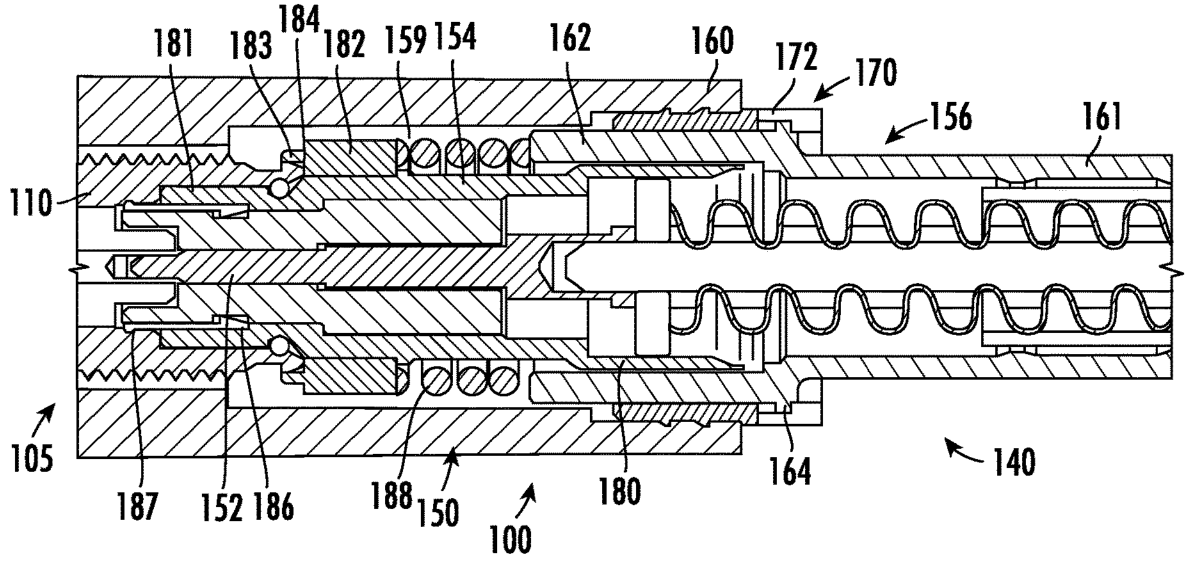
FIG. 7 is a side section view of one of the connectors and cables of the assembly of FIG. 6.

Another assembly, designated broadly at 100, is illustrated in FIGS. 6-18. As shown in FIGS. 6 and 7, the assembly 100 includes an equipment connector assembly 105 that is similar to the assemblies 1205, 1705 discussed above, and a cable-connector assembly 140 that is similar to the assemblies 1240, 1740 discussed above. However, the manner in which the connectors 150 are mounted within the shell 160 of the cable-connector assembly 140 enables a single connector 150 and cable 142 to be removed and replaced while retaining the remaining cable-connector pairs.

As seen in FIGS. 7-10, a retainer ring 170 is mounted in the shell 160 (typically with barbs, ridges or similar features to maintain the retainer ring 170 in place). The retainer ring 170 is generally cylindrical and includes four fingers 172 at its rear end. Each of the fingers 172 has an overhanging lip 173 that extends radially inward to define a groove 174 (labelled in FIG. 15) with the rear end of the main body 171 of the retainer ring 170. Two gaps 175 are present between adjacent pairs of fingers 172 and are diametrically opposite each other. Two additional gaps 176 are present between alternative adjacent pairs of fingers 172 and are also diametrically opposite each other, with the gaps 176 being approximately 90 degrees from the gaps 175. The gaps 176 are narrower in width (i.e., the dimension between the adjacent fingers 172) than are the gaps 175.

Figure 8:
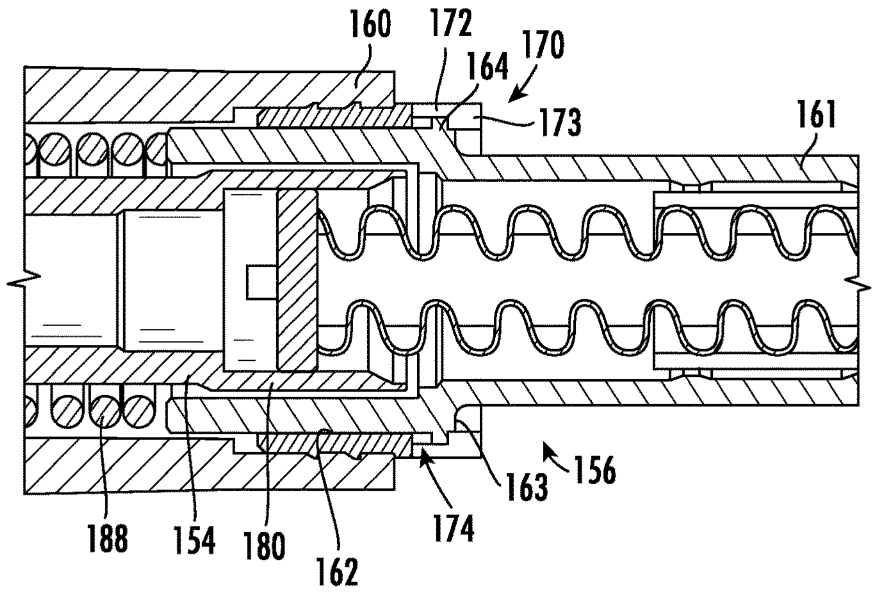
FIG. 8 is an enlarged section view of the connector and cable of FIG. 7.
Figure 9:
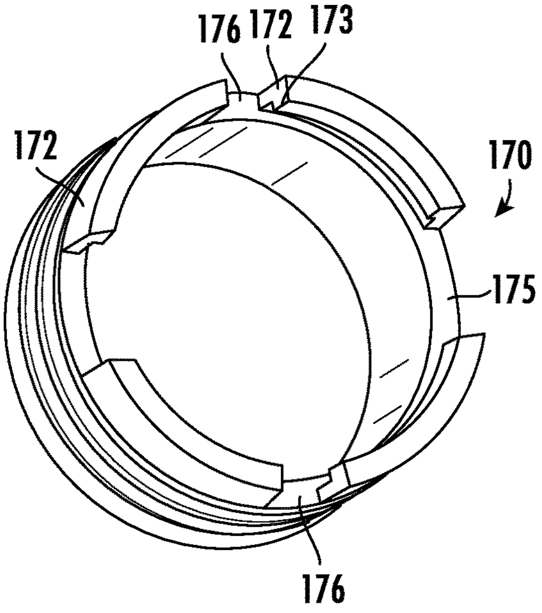
FIG. 9 is a rear perspective view of a retainer ring of the assembly of FIG. 6.
Figure 10:
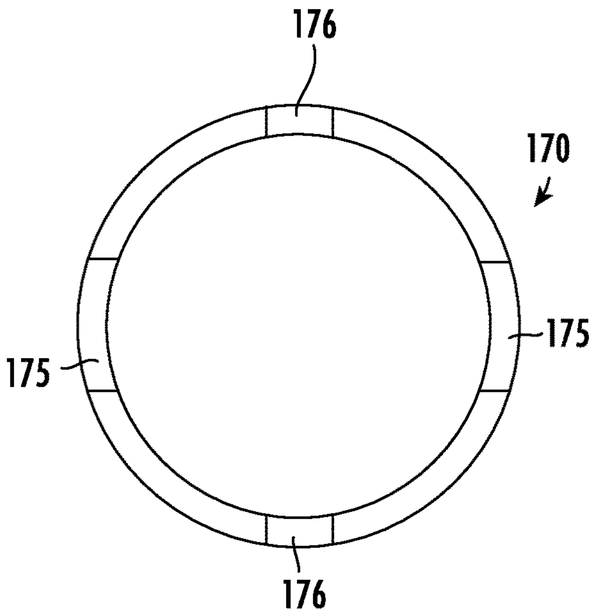
FIG. 10 is a rear view of the retainer ring of FIG. 9.
Figure 11:
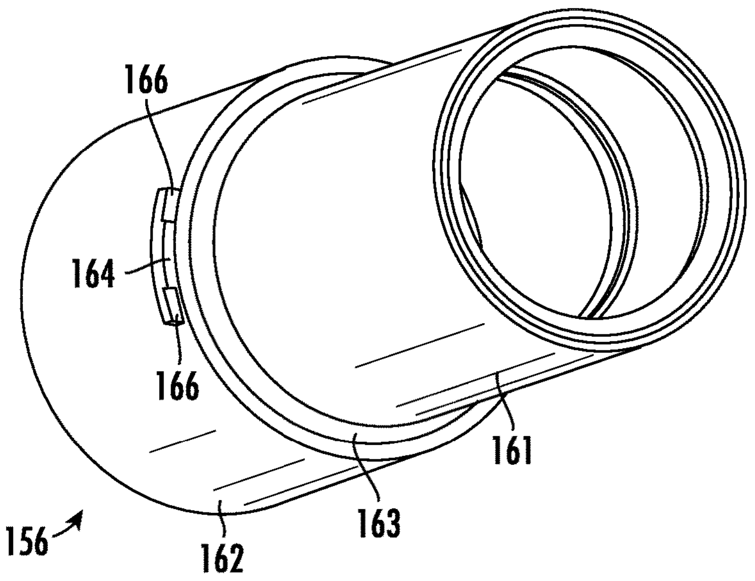
FIG. 11 is a rear perspective view of a rear body of the assembly of FIG. 6.
Figure 12:
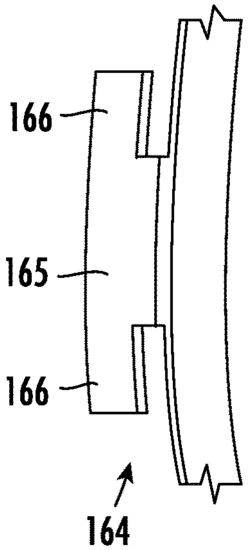
FIG. 12 is a greatly enlarged partial rear view of one of the locking tabs of the rear body of FIG. 11.

As seen in FIGS. 7, 8 and 11, a rear body 156 of the connector 150 is generally cylindrical, with a smaller rear end 161 and a wider front end 162 divided at a shoulder 163. Two locking tabs 164 extend radially outwardly near the shoulder 163. Each of the tabs 164 includes a larger middle portion 165 and smaller wings 166. Together, the middle portion 165 and the wings 166 are narrower in width than the gaps 175, but together are wider than the gaps 176. The middle portion 175 itself is slightly narrower than the gaps 176.

In addition to an inner contact 152, the connector 150 also includes an outer body 154 that is somewhat similar to that of the connector 1750 described above. The outer body 154 has a "tail" 180 that fits within the front end 162 of the rear body 156 (and is free to move axially and slightly radially relative thereto), an interface ring 181 at the opposite end, and a shoulder 182 with a projection 183 that defines a groove 184 that receives the outer connector body 110 of the mating connector 105. The shoulder 182 has six "hex" faces about its perimeter that fits within six hex faces in the cavity of the shell 160 to prevent rotation of the connector 150 relative to the shell 160. A spring basket 186 with fingers 187 is positioned radially inwardly of the interface ring 181. A helical spring 188 is positioned between the shoulder 182 and the forward end of the rear body 156.

Figure 13:
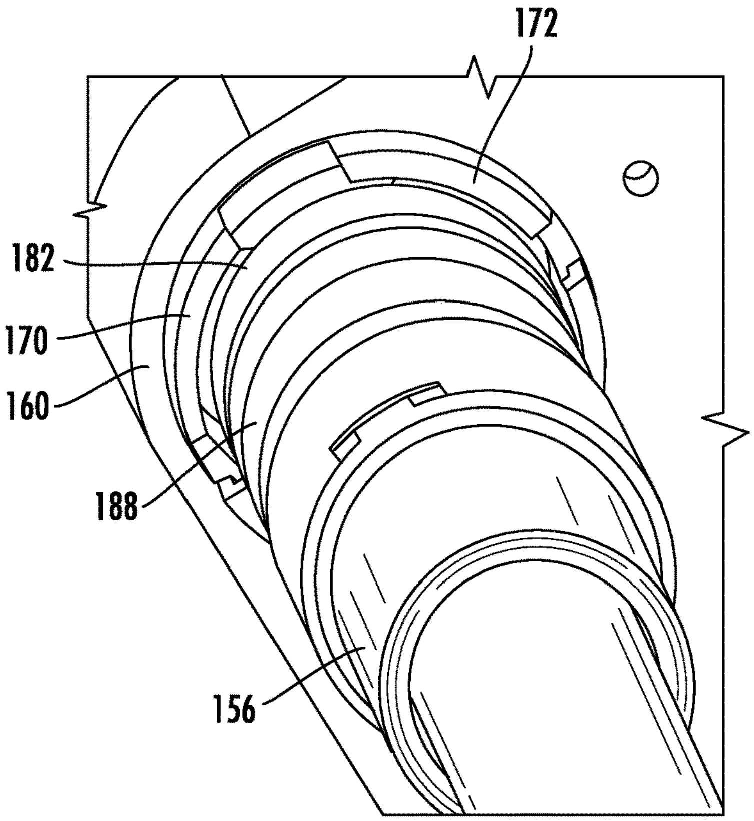
FIG. 13 is a rear perspective view of a cable, connector and rear body for the assembly of FIG. 6 being inserted into the retainer ring of FIG. 9.
Figure 14:
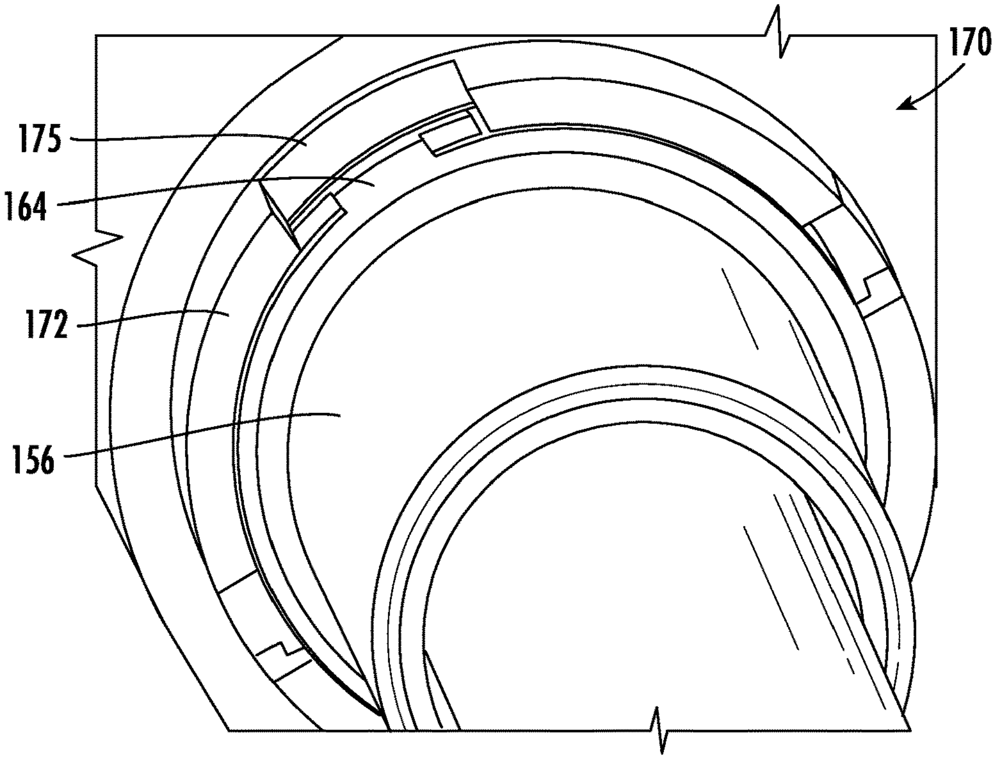
FIG. 14 is a greatly enlarged rear perspective view of the rear body of FIG. 13 in the unlocked position as it is inserted into one of the larger gaps of the retainer ring of FIG. 9.
Figure 15:
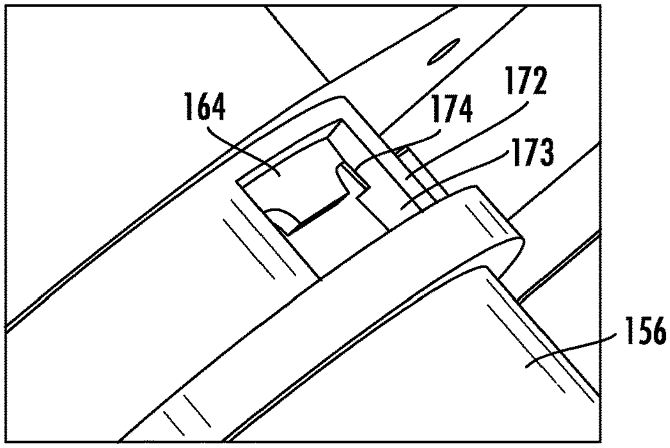
FIG. 15 is a greatly enlarged perspective view of a locking tab of the rear body of FIG. 11 inserted into one of the larger gaps of the retainer ring of FIG. 9 in the unlocked position prior to rotation.
Figure 16:
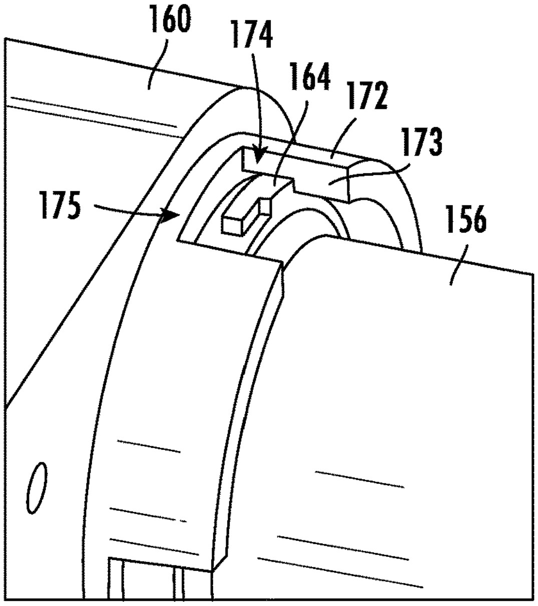
FIG. 16 illustrates the locking tab of FIG. 15 being rotated from the unlocked position toward the locked position into the groove of the retainer ring.

Installation of the connector 150 begins with the insertion of the retainer ring 170 into a cavity 159 of the shell 160. The ridges of the retainer ring 170 help to maintain it in position. Next, the connector 150, which is attached to the cable 142, is inserted through the retainer ring 170 (FIG. 13). The front end 162 of the rear body 156 passes through the fingers 172 of the retainer ring 170; as the locking tabs 164 approach the fingers 172, the rear body 156 is rotated relative to the retainer ring 170 so that the locking tabs 164 align with the gaps 175 (FIGS. 14 and 15). In this unlocked position, the locking tabs 164 are able to fit within the gaps 175 and therefore move axially relative to the retainer ring 170. As the rear body 156 continues to move forward after the locking tabs 164 enter the gaps 175, the front end of the rear body 156 engages the spring 188 and forces it into compression against the shoulder 182 of the outer body 154 of the connector 150. Also, once aligned, the hex faces of the shoulder 182 of the outer body 154 engage the hex faces of the shell 160 to prevent relative rotation of the connector 150 and the shell 160.

Figure 17:
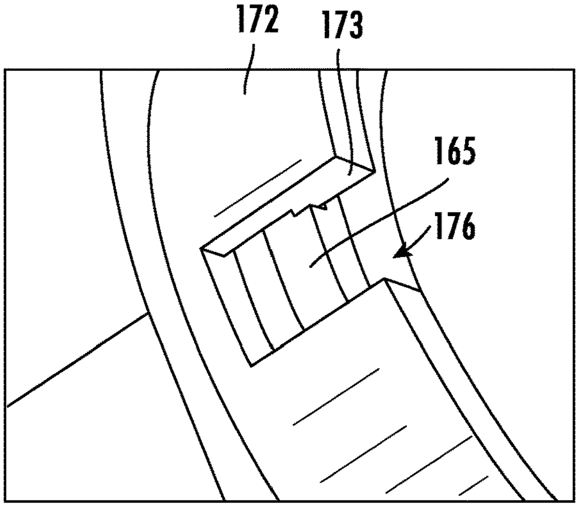
FIG. 17 is a greatly enlarged perspective view of the locking tab of FIG. 15 rotated into a smaller gap of the retainer ring and into the locked position, locking the rear body in place.
Figure 18:
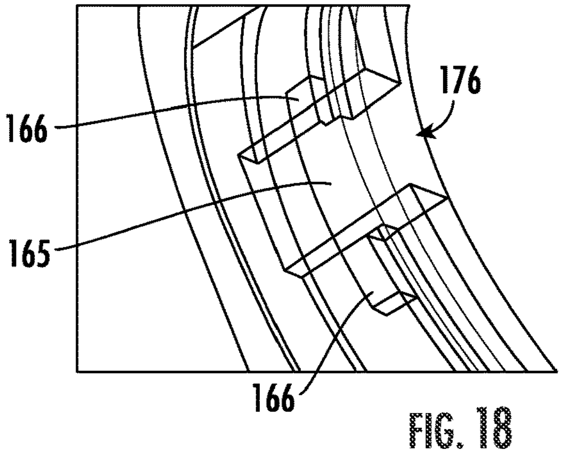
FIG. 18 is a perspective view of the locking tab in the locked position as in FIG. 17 with the retainer ring being shown as transparent.
Figure 19:
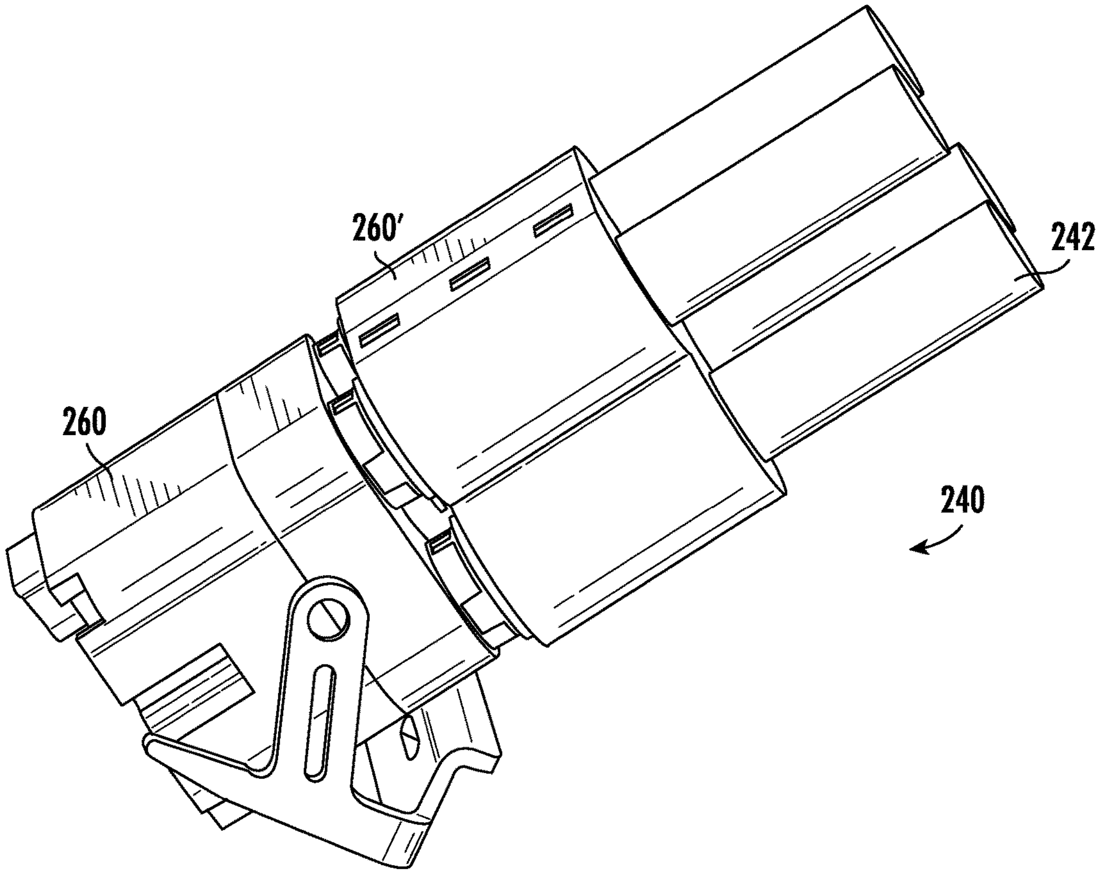
FIG. 19 is a perspective view of a ganged coaxial connector assembly according to alternative embodiments of the invention.

Once the locking tabs 164 "clear" the lip 173 of the retaining ring 170 (FIG. 15), the rear body 156 is rotated relative to the outer connector body 154 and the shell 160 (FIG. 16) toward the locked position. The locking tabs 164 are received in the groove 174. The rear body 156 is forced rearwardly by the spring 188 so that the middle portion 165 of each of the looking tabs 164 is forced against the forward edge of the lip 173. Once the rear body 156 has rotated approximately 90 degrees, the locking tabs 164 reach the gaps 176 (FIG. 17). The pressure from the spring 188 forces the middle portion 165 of each locking tab 164 rearwardly into a respective gap 176. The wings 166 of the locking tabs 164 extend beyond the gap 176 and remain in engagement with the lip 173. The positioning of the middle portions 165 of the locking tabs 164 within the gaps 176 "locks" the rear body 156 in the locked position (see FIGS. 17 and 18). From this locked position the outer body 154 of the connector 150 is able to float relative to the rear body 156 during mating, with the spring 188 providing sufficient compression that the outer body 154 is stable once it has "floated" relative to the rear body 156; however, the rear body 156, and in turn the connector 150, are prevented from rearward axial movement by the retainer ring 170.

If the cable 142 or connector 150 becomes inoperable or otherwise needs replacing, the rear body 156 can be pressed forward until the middle portion 165 of each locking tab 164 "clears" the lip 173. The rear body 156 can then be rotated until the locking tabs 164 reach the gaps 175 (i.e., to the unlocked position). The rear body 164, the connector 150 and the cable 142 can then be slipped rearwardly through the retaining ring 170 and replaced with another cable, connector and rear body.

Figure 20:
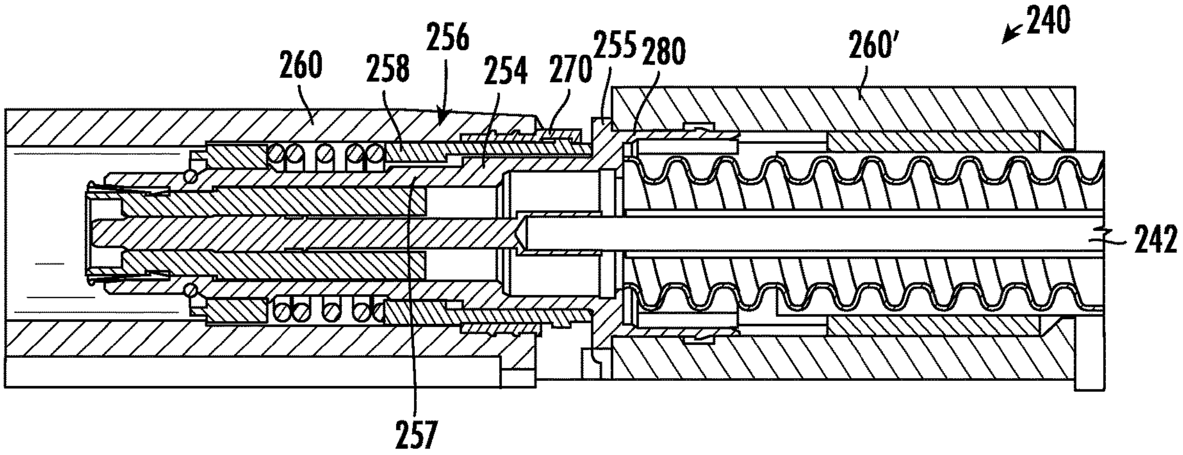
FIG. 20 is s side section view of one cable and connector of the assembly of FIG. 19.
Figure 21:
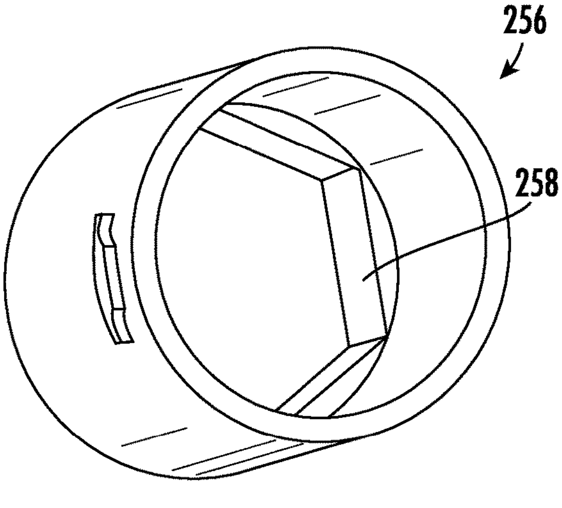
FIG. 21 is a rear perspective view of a rear body of the assembly of FIG. 19.
Figure 22:
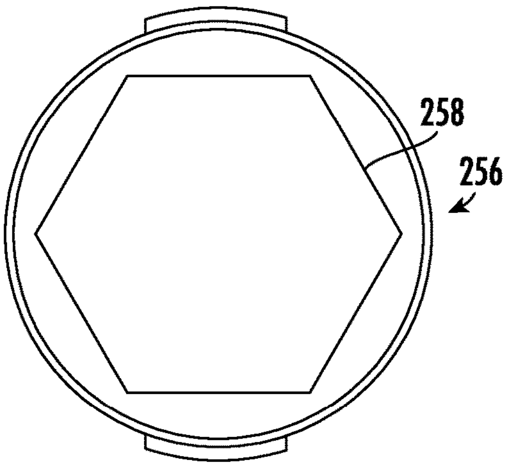
FIG. 22 is a rear end view of the rear body of FIG. 21.
Figure 23:
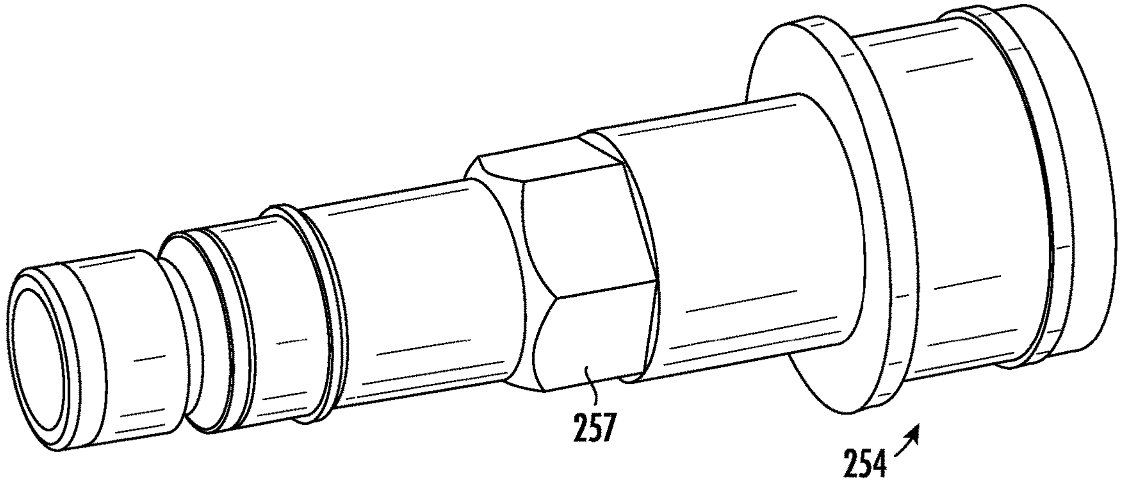
FIG. 23 is a front perspective view of the outer body of one of the connectors of the assembly of FIG. 19.

Those of skill in this art will appreciate that the ganged connector assembly may take other forms. As an example, FIGS. 19-28 illustrate a ganged cable-connector assembly 240 that utilizes a different connector configuration. More specifically, the assembly 240 has a front shell 260 and a rear shell 260', and the outer connector body 254 of each of the connectors 250 includes a wider tail 280 to accommodate larger cables 242. The tail 280 extends rearwardly beyond the rear body 256 and the retainer ring 270. An outer flange 255 is present between the shells 260, 260'. The length of the tail 280 prevents access to the rear body 256. Also, as can be seen in FIG. 20, an outer flange 255 of the outer body 254 is wider (i.e., has a larger outer diameter) than the retainer ring 270.

Figure 24:
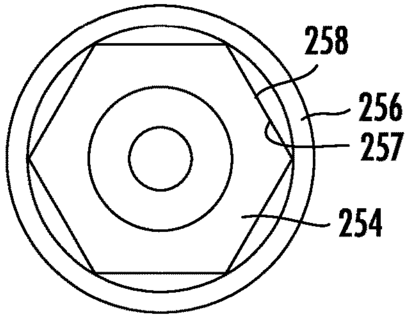
FIG. 24 is a rear view of the outer body of FIG. 23 inserted in the rear body of FIG. 21.
Figure 25:
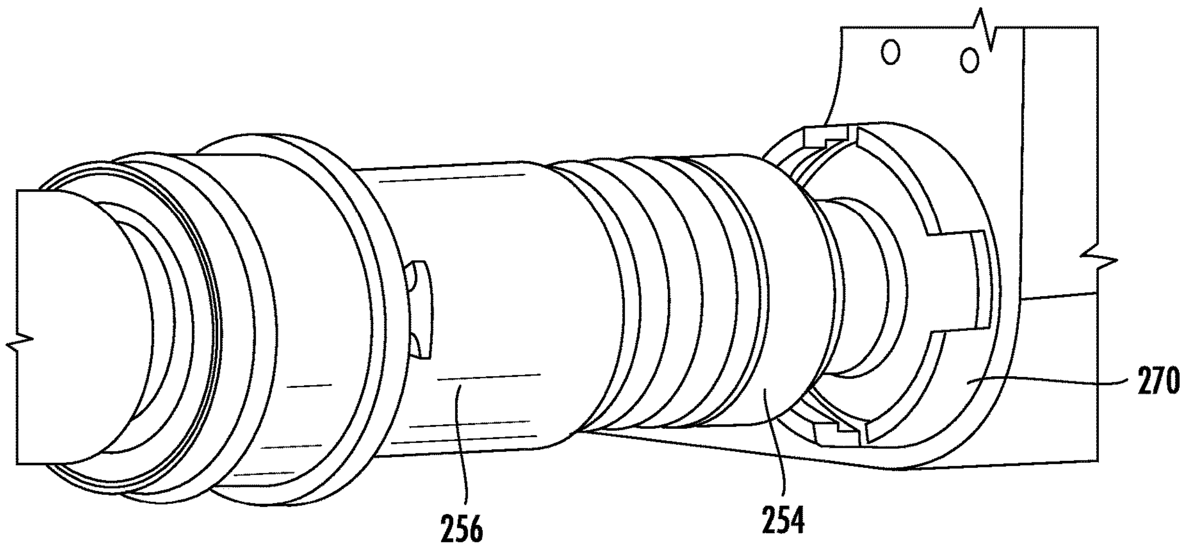
FIG. 25 is a rear perspective view of a cable, connector and rear body of the assembly of FIG. 19 being inserted into a retainer ring and into the unlocked position.
Figure 26:
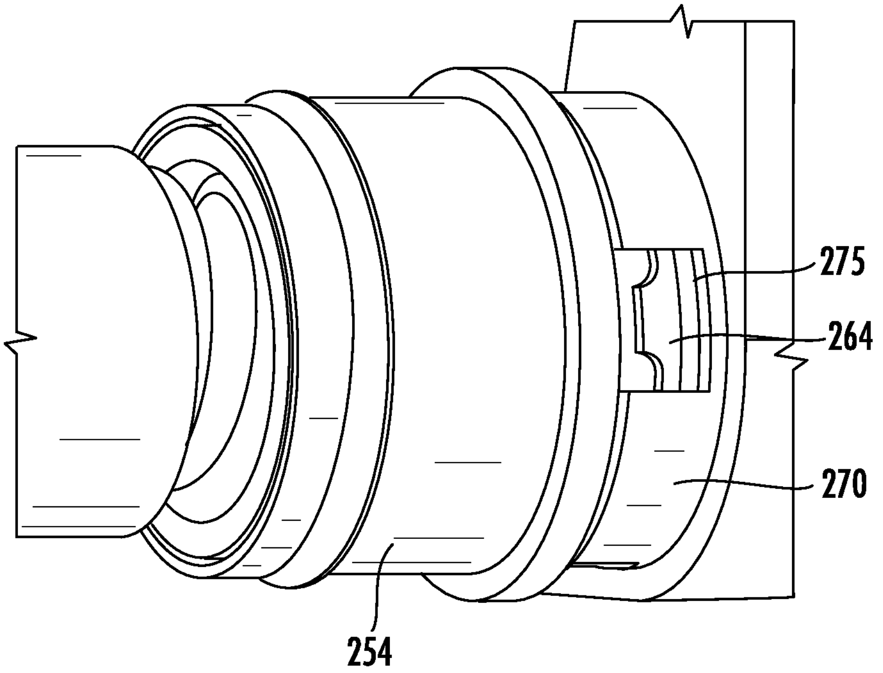
FIG. 26 is an enlarged partial perspective view of the connector and rear body of FIG. 25, with the locking tab of the rear body in the unlocked position and inserted into one of the large gaps of the retainer ring of FIG. 25.
Figure 27:
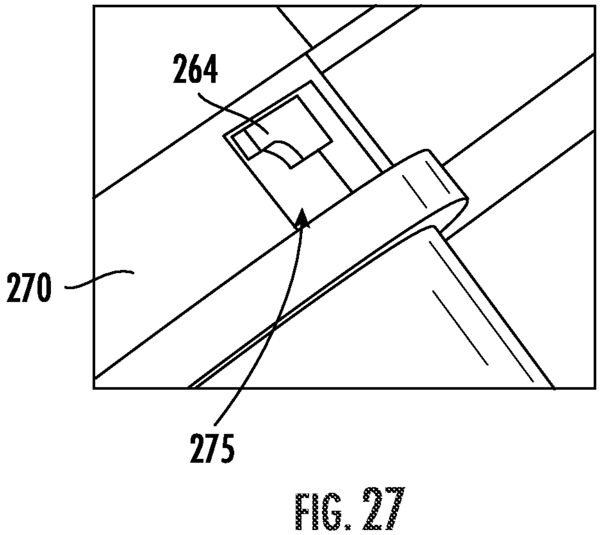
FIG. 27 is a greatly enlarged perspective view of the rear body of FIG. 26 being rotated relative to the retainer ring from the unlocked position to the locked position, with the locking tab being received within the groove of the retainer ring.
Figure 28:
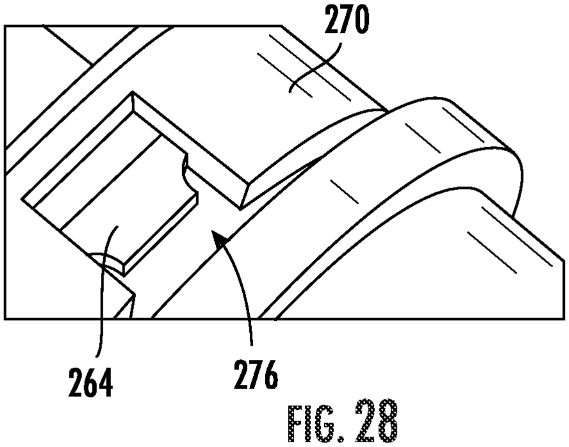
FIG. 28 is a greatly enlarged perspective view of the locking tab of the rear body of FIG. 27 rotated into a smaller gap of the retainer ring to the locked position to lock the rear body in place relative to the retainer ring.

Because the rear body 256 is not accessible for grasping to impart rotation, instead the cable 242 itself is employed to impart rotation. Thus, the outer body 254 includes a hex section 257 on its outer surface and the rear body 256 includes a corresponding hex section 258 on its inner surface (see FIGS. 21-24). These hex sections 257, 258 engage each other and prevent relative rotation between the rear body 256 and the outer body 254 (FIG. 24). Consequently, when the connector 250 and rear body 256 are inserted into the retainer ring 270, rotation of the cable 242 rotates the connector 250 and the engaged (via the hex sections 257, 258) rear body 256 relative to the retainer ring 270. With that exception, the installation of the cable 242 and connector 250 follow the same steps as described above for the connector 150; in the unlocked position the locking tabs 264 are inserted through the gaps 275 in the retainer ring 270, the locking tabs 264 are rotated in the groove 274, and ultimately engage the lip 273 within the gaps 276 in the locked position the manner described above (see FIGS. 25-28). Thus, the cable 242 and connector 250 can be installed and removed without disturbing the other cables and connectors of the assembly 240.

Figure 29:
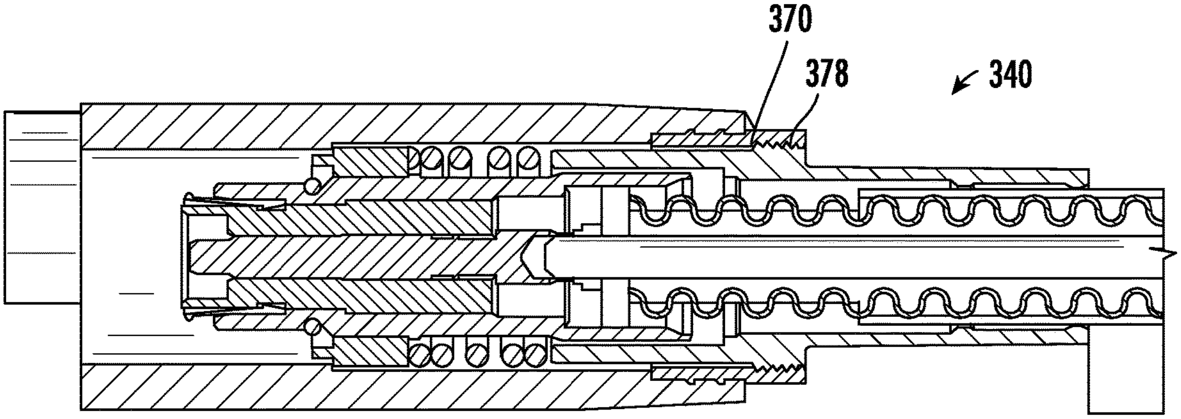
FIG. 29 is a section view of a connector for a ganged coaxial connector assembly according to additional embodiments of the invention.
Figure 30:
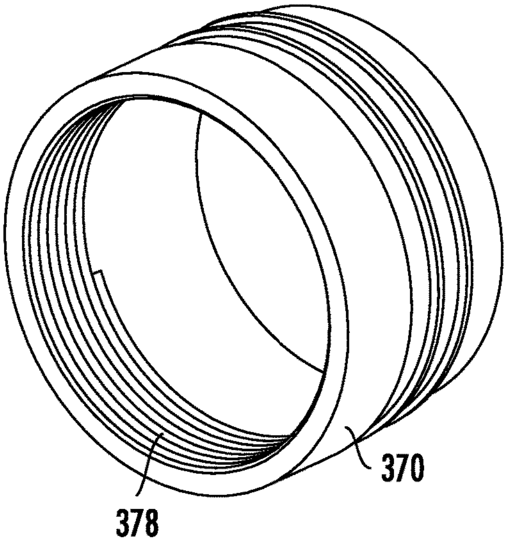
FIG. 30 is a front perspective view of a retainer ring of the assembly of FIG. 29.
Figure 31:
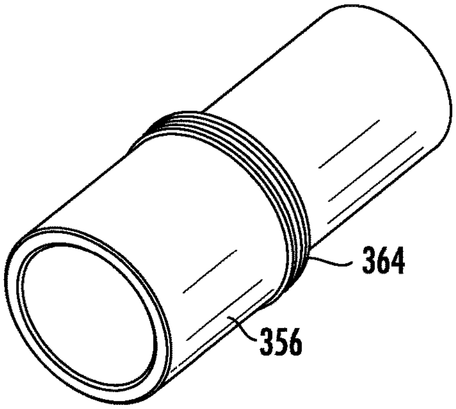
FIG. 31 is a rear perspective view of a rear body of the assembly of FIG. 29.

Referring now to FIGS. 29-31, another cable-connector assembly, designated broadly at 340, is shown therein. The assembly 300 is similar to the assembly 100 above with the exception that the retainer ring 370 relies on helical threads 378 on its inner surface to engage helical threads 364 on the outer surface of the rear body 356. Rotation of the rear body 356 relative to the cable 342, connector 350 and retainer ring 370 moves the rear body between unlocked and locked positions, and therefore enables the cable 342 and connector 350 to be installed or removed from the shell 360 while leaving the remaining cables and connectors in place.

Those of skill in this art will recognize that the assembly may take other forms. For example, the coaxial connectors may be configured differently and/or have different interfaces (e.g., DIN, 4.3/10, 2.2/5, NEX10, etc.). The connectors maybe different in number and/or arrangement. The shells are shown herein as being generally square in footprint, but may take another form (e.g., rectangular, circular, oval, etc.). Other variations are also contemplated.

It is also contemplated that, rather than utilizing the retainer rings 170, 270, 370 mounted in their respective shells 160, 260, 360, in some embodiments the features of the retainer rings 170, 270, 370 (i.e., the grooves, lips, and gaps of the retainer rings 170, 270 and the threads of the retainer ring 370) may be formed directly into the shells 160, 260, 360.

Further, it will be understood that locking mechanisms/features other than the tabs of the rear body and the gaps of the retainer ring may be employed. For example, rather than employing fully open gaps such as the gaps 176, 276 to lock the tabs in place, the retainer rings 170, 270 may include another type of recess (such as a recess with a closed rear end) that receives the tabs and lock them in place. Such a configuration may employ tabs that lack the wings 166 illustrated therein. Alternatively, the retainer rings 170, 270 may include only the gaps 175, 275 that enable insertion and removal of the tabs 164, 264, and rely on the pressure and resultant friction created by the spring 188 against the lips 173, 273 as locking features that lock the rear body 156, 256 in a locked position. Other variations may also be employed.

Moreover, although the hex faces are employed to prevent either rotation between the connector and the shell (in the case of the assemblies 140, 340) or between the connector and the rear body (in the case of the assembly 240), other non-rotation features may be used, such as a post and slot combination.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of replacing a coaxial cable and connector in a ganged connector assembly, the method comprising:

(a) providing a ganged connector assembly comprising:

a plurality of coaxial connectors, each of the coaxial connectors connected with a respective coaxial cable extending rearwardly therefrom, each of the coaxial connectors including an inner contact and an outer body that is electrically separated from the inner contact;

a shell having a plurality of cavities; and a plurality of rear bodies, each of the rear bodies encircling a respective outer body, each of the rear bodies mounted in a respective cavity of the shell;

wherein each of the rear bodies includes a first locking feature, and wherein a second locking feature is located in each of the cavities and is fixed relative to the shell, the first locking feature engaging the second locking feature to secure the rear body, the cable and the connector into the shell;

(b) disengaging the first locking features of a first one of the plurality of rear bodies from the second locking features of a first one of the plurality of cavities;

(c) removing the first coaxial connector and its respective coaxial cable and rear body from the first cavity;

(d) inserting a replacement coaxial connector, cable and rear body unit into the first cavity; and (e) engaging a third locking feature on the rear body of the replacement coaxial connector, cable and rear body unit with the second locking features of the first cavity.

2. The method defined in claim 1, wherein disengaging the first locking features comprises rotating the first locking features relative to the second locking features.

3. The method defined in claim 1, further comprising a plurality of retainer rings, each of the retainer rings fixed within a respective cavity, wherein each retainer ring includes the second locking feature.

4. The method defined in claim 1, further comprising a biasing member associated with the first coaxial connector, the biasing member biasing the first rear body rearwardly, wherein the biasing member maintains the first rear body in the locked position.

5. The method defined in claim 1, wherein the first locking feature comprises a radially-outward tab, and the second locking feature comprises a discontinuous lip with a first gap, and wherein the first gap is sized to permit the tab to pass forwardly and rearwardly therethrough in the unlocked position, and the lip prevents the tab from rearward movement in the locked position.

6. The method defined in claim 5, wherein the lip includes a recess, the recess being sized and configured to prevent the tab from passing rearwardly therethrough.

7. The method defined in claim 6, wherein the tab includes a main body and wings extending from opposite sides of the main body, wherein the recess is a second gap, and wherein in the locked position the main body is positioned in the second gap and the wings engage the lip.

8. The method defined in claim 1, wherein the first connector and the shell include non-rotation features that engage to prevent rotation of the first connector relative to the shell in the unlocked position.

9. The method defined in claim 1, wherein the first connector and the first rear body include non-rotation features that engage to prevent rotation of the first connector relative to the first rear body in the unlocked position.

10. The method defined in claim 1, wherein the first and second locking features comprise first and second helical threads.

11. The method defined in claim 10, further comprising a plurality of retainer rings, each of the retainer rings fixed within a respective cavity, wherein each retainer ring includes the second thread.

* * * * *